United States Patent
Hirano et al.

(10) Patent No.: US 9,849,639 B2
(45) Date of Patent: Dec. 26, 2017

(54) ANNEALING METHOD, ANNEALING JIG AND ANNEALING APPARATUS

(71) Applicant: SHARP KABUSHIKI KAISHA, Osaka-shi, Osaka (JP)

(72) Inventors: Kenji Hirano, Osaka (JP); Hiroyuki Hanato, Osaka (JP); Takahiro Nakahashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 313 days.

(21) Appl. No.: 14/422,934

(22) PCT Filed: Jul. 12, 2013

(86) PCT No.: PCT/JP2013/069148
§ 371 (c)(1),
(2) Date: Feb. 20, 2015

(87) PCT Pub. No.: WO2014/030462
PCT Pub. Date: Feb. 27, 2014

(65) Prior Publication Data
US 2015/0224722 A1    Aug. 13, 2015

(30) Foreign Application Priority Data
Aug. 22, 2012 (JP) .................. 2012-183635

(51) Int. Cl.
*B29C 71/02* (2006.01)
*B29C 71/00* (2006.01)
*B29K 63/00* (2006.01)

(52) U.S. Cl.
CPC .......... *B29C 71/02* (2013.01); *B29C 71/0063* (2013.01); *B29C 2071/022* (2013.01); *B29K 2063/00* (2013.01)

(58) Field of Classification Search
CPC . B29C 71/02; B29C 71/0072; B29C 71/0063; B29C 2071/022
USPC ...................................... 264/235
See application file for complete search history.

(56) References Cited

FOREIGN PATENT DOCUMENTS

| JP | 50-36581 | 11/1975 |
|---|---|---|
| JP | 11-123770 | 5/1999 |
| JP | 2001-38816 | 2/2001 |
| JP | 2005-47126 | 2/2005 |

(Continued)

OTHER PUBLICATIONS

Sagawa Koichi, English Translation of JP 2005-047126, Feb. 24, 2005.*

(Continued)

*Primary Examiner* — Matthew Daniels
*Assistant Examiner* — Hana Page
(74) *Attorney, Agent, or Firm* — Nixon & Vanderhye P.C.

(57) ABSTRACT

An annealing method according to the present invention is an annealing method of annealing a molded body (1) which is molded from a molding material in a molding step, and the method includes the steps of: (I) releasing stress from the molded body (1) by heating the molded body (1); and (II) correcting a warp of the molded body (1), by simultaneously heating the molded body (1) and applying a load to the molded body (1). This achieves an annealing method which makes it possible to obtain a molded body that is free from residual stress and distortion.

8 Claims, 11 Drawing Sheets

(56) References Cited

FOREIGN PATENT DOCUMENTS

JP        2005-153503        6/2005

OTHER PUBLICATIONS

Toshihiko Takegawa, English Translation of JP2001-038816, Feb. 13, 2001.*
Keijiro Kadokawa, Takehiko Uchida, Shunichi Yoshioka, English Translation of JPH07188436, Jul. 25, 1995.*
Nobuo Yokota, English Translation of JP2005-153503, Jun. 16, 2005.*
Jerry Fischer, Handbook of Molded Part Shrinkage and Warpage, Jan. 1, 2003.*
Dominick Rosato, Donald Rosato, Marlene Rosato. Injection Molding Handbook. Published in 2000.*
Risuke Suzuki. English Translation of FR2142797. Feb. 2, 1973.*
International Search Report for PCT/JP2013/069148, dated Aug. 6, 2013, 4 pages.
Written Opinion of the International Searching Authority for PCT/JP2013/069148, dated Aug. 6, 2013, 8 pages.

* cited by examiner (a)

(b)

B-B' CROSS-SECTIONAL VIEW (a)

(b)

EXCESSIVELY EXPANDED BY $\alpha \cdot \Delta T_w$

ANNEALING METHOD, ANNEALING JIG AND ANNEALING APPARATUS

This application is the U.S. national phase of International Application No. PCT/JP2013/069148, filed 12 Jul. 2013, which designated the U.S. and claims priority to JP Patent Application No. 2012-183635, filed 22 Aug. 2012, the entire contents of each of which are hereby incorporated by reference.

TECHNICAL FIELD

The present invention relates to an annealing method of annealing a molded body which is molded from a molding material, and an annealing jig, and an annealing apparatus each of which is for annealing a molded body which is molded from a molding material.

BACKGROUND ART

A molded body which is obtained by molding a molding material according to an injection molding method, a compression molding method, or the like has, in general, residual stress and/or distortion due to thermal expansion/contraction, or curing contraction (in a case where the molding material is a curable material). An annealing process in which the molded body is reheated is carried out after a molding process of the molded body. This annealing process is intended to release the residual stress and cancel the distortion (see Patent Literatures 1 through 3, for example).

Patent Literature 1 discloses a configuration (see FIG. 13) in which a disk substrate 101 is supported by use of a substrate supporting member 120. In this configuration, this substrate supporting member 120 supports a whole surface of one main surface of the disk substrate 101 except an outer circumferential end portion 105 and an inner circumferential end portion 106 of the one main surface so that the occurrence of a burr of the disk substrate 101 is prevented during annealing to the disk substrate 101 that is a molded body.

Patent Literature 2 discloses a configuration (see FIG. 14) in which clamping plates 201 through 204 made of aluminum or the like are provided in a total of four directions, that is, front and back surface directions and a pair of both side-surface directions of a molded body 205, so as to prevent a warp of the molded body 205 during annealing of the molded body 205 that is a plate-like thermoplastic resin.

Patent Literature 3 discloses a configuration in which distortion of a molded article is eliminated, by separately providing a heating section having a heating plate and a cooling section having a cooling plate in an annealing apparatus for a wafer molded body and thereby allowing the annealing apparatus to heat and cool the molded body successively.

CITATION LIST

Patent Literatures

Patent Literature 1
Japanese Patent Application Publication, Tokukai, No. 2001-38816 (Publication Date: Feb. 13, 2001)
Patent Literature 2
Japanese Patent Application Publication, Tokukai, No. 2005-47126 (Publication Date: Feb. 24, 2005)
Patent Literature 3
Japanese Patent Application Publication, Tokukai, No. 11-123770 (Publication Date: May 11, 1999)

SUMMARY OF INVENTION

Technical Problem

Although in the configuration disclosed in Patent Literature 1, the inner circumferential end portion 106 is weighed down by a weight 125, an upper surface of the disk substrate 101 is not wholly weighed down. Therefore, a portion on which the disk substrate 101 is not weighed down may rise and warp.

In the configuration disclosed in Patent Literature 2, a pair of side surfaces of the molded body 205 is not fixed. Accordingly, when the stress of the molded body 205 is released, material molecules naturally move in only directions toward the pair of side surfaces that are not fixed. Because the moving direction of the material molecules is restricted, the stress is not sufficiently released and further, deformation of the molded body 205 occurs only in a specific direction. As a result, a shape of the molded body 205 may lose symmetry.

In the configuration disclosed in Patent Literature 3, because the molded body is cooled rapidly during transfer to the cooling section and in the cooling section, a warp may occur due to unevenness in cooling.

The present invention is attained in view of the above problems, and an object of the present invention is to provide an annealing method, an annealing jig, and an annealing apparatus each of which makes it possible to obtain a molded body that is free from residual stress and distortion.

Solution to Problem

In order to attain the object, an annealing method according to an aspect of the present invention is a method of annealing a molded body which is molded from a molding material in a molding step, including the steps of: (I) releasing stress from the molded body by heating the molded body; and (II) correcting a warp of the molded body, by simultaneously heating the molded body and applying a load to the molded body.

A pair of two annealing jigs according to an aspect of the present invention are a pair of two annealing jigs that sandwiches therebetween an upper surface and a lower surface of a molded body having been molded into a plate-like shape from a molding material, the pair of two annealing jigs being used for applying a load to the molded body when the molded body whose stress has been released by heating is reheated.

Advantageous Effects of Invention

An annealing method according to an aspect of the present invention is an annealing method according to an aspect of the present invention is a method of annealing a molded body which is molded from a molding material in a molding step, including the steps of: (I) releasing stress from the molded body by heating the molded body; and (II) correcting a warp of the molded body, by simultaneously heating the molded body and applying a load to the molded body. Accordingly, the annealing method of the present invention makes it possible to advantageously obtain a molded body that is free from residual stress and distortion because stress is sufficiently released.

Figure 4:
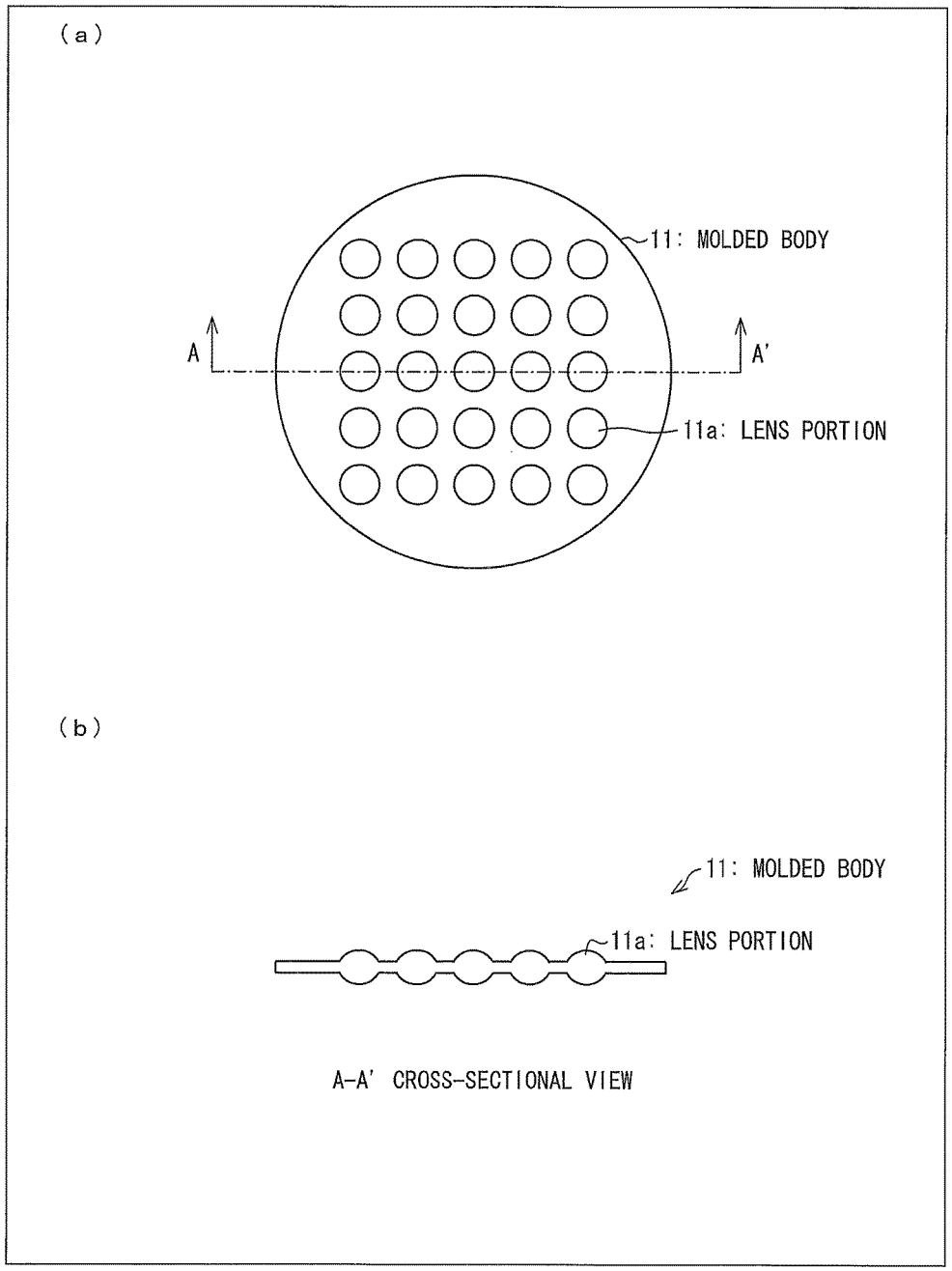

(a) of FIG. 4 is a plan view of a molded body according to Embodiment 1 of the present invention. (b) of FIG. 4 is a cross-sectional view of the molded body taken along the line A-A'.

Figure 5:
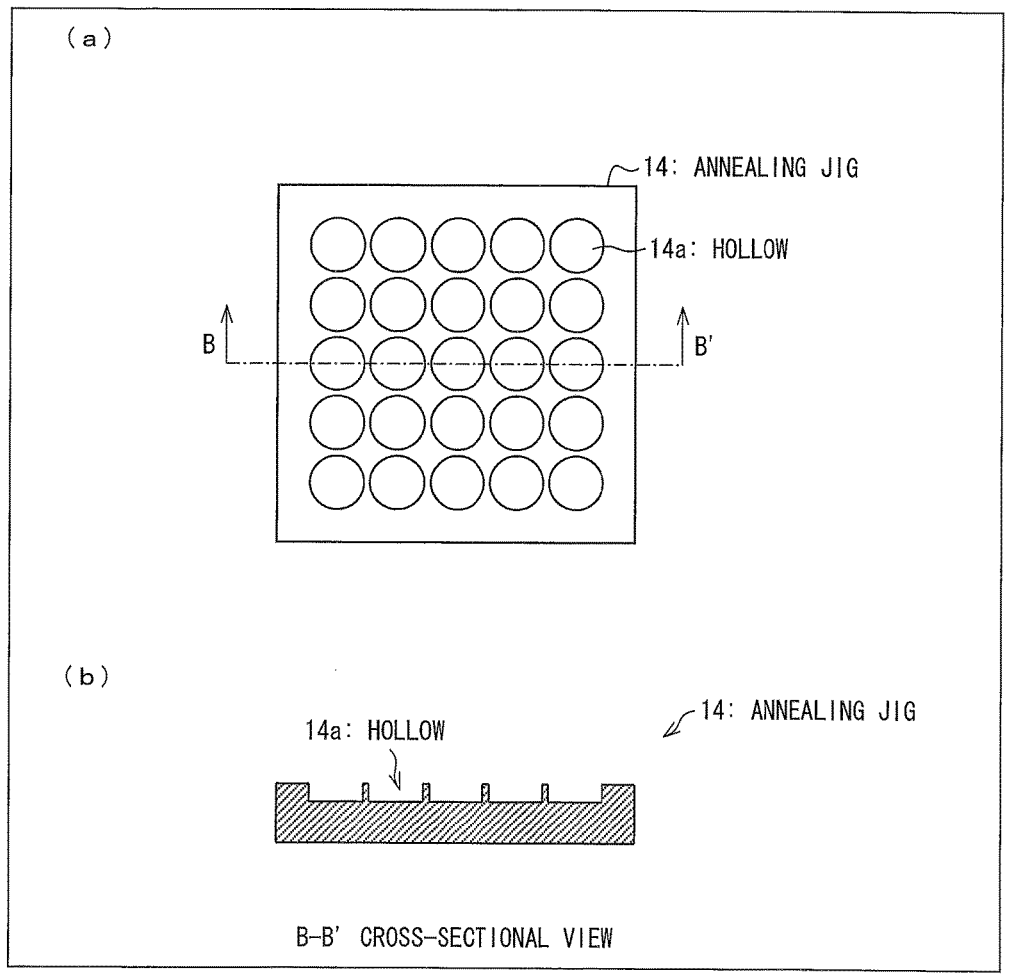

(a) of FIG. 5 is a plan view of an annealing jig according to Embodiment 1 of the present invention. (b) of FIG. 5 is a cross-sectional view of the annealing jig taken along the line B-B'.

Figure 6:
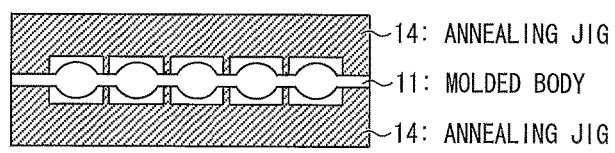

FIG. 6 is a cross-sectional view of a state in which the molded body illustrated in FIG. 4 is sandwiched between the annealing jigs illustrated in FIG. 5.

Figure 7:
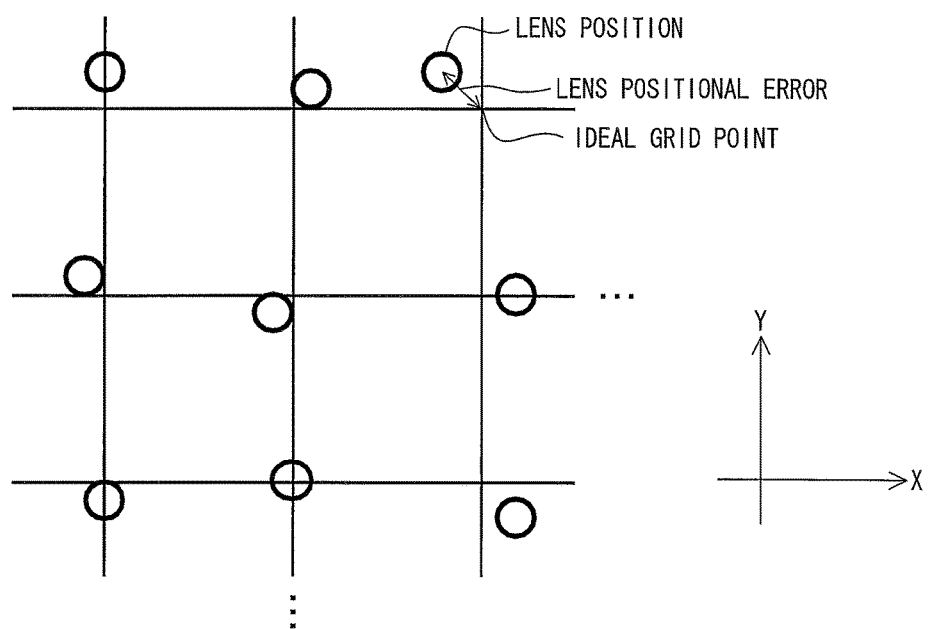

FIG. 7 is a diagram for explaining lens positional errors.

Figure 8:
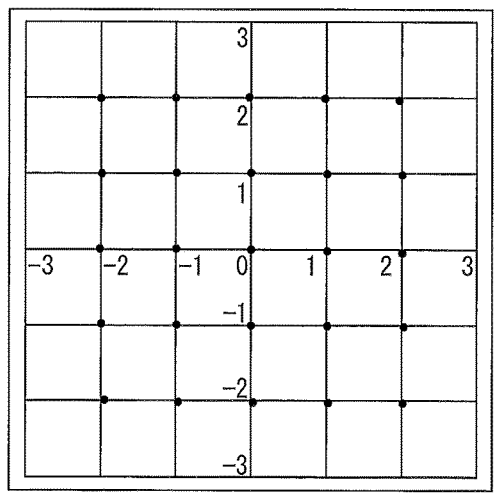
Figure 8:
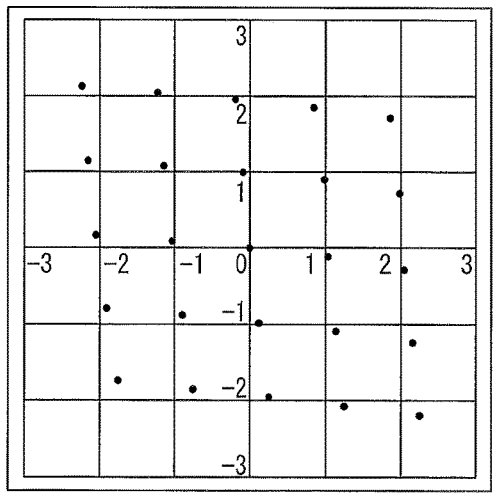

(a) of FIG. 8 is a plan view illustrating lens positional errors of a molded body obtained according to an annealing method of an embodiment of the present invention. (b) of FIG. 8 is a plan view illustrating lens positional errors of a molded body obtained according to a conventional annealing method.

Figure 9:
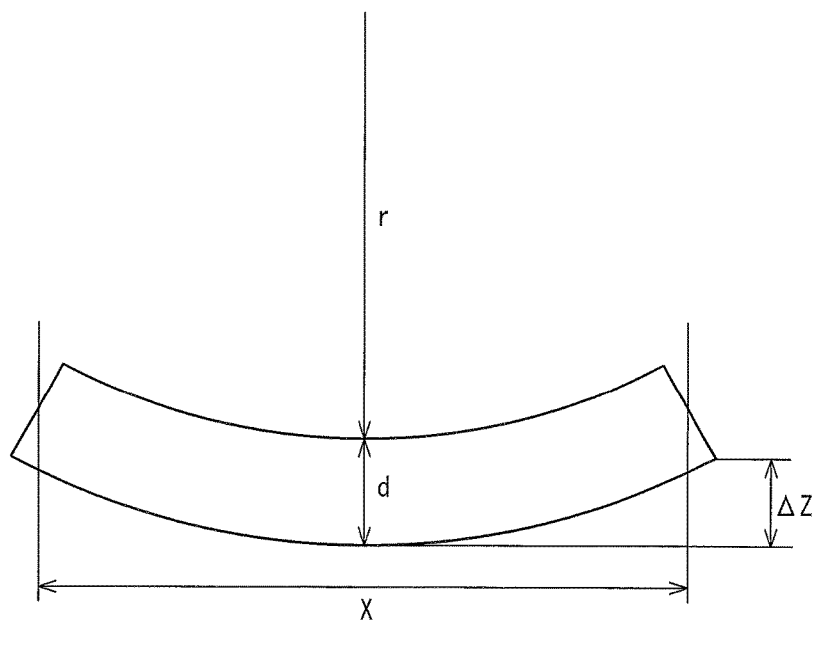

FIG. 9 is a diagram for explaining a relationship between (i) a difference in temperature between an upper surface and a lower surface of a molded body and (ii) a warp of the molded body.

Figure 10:
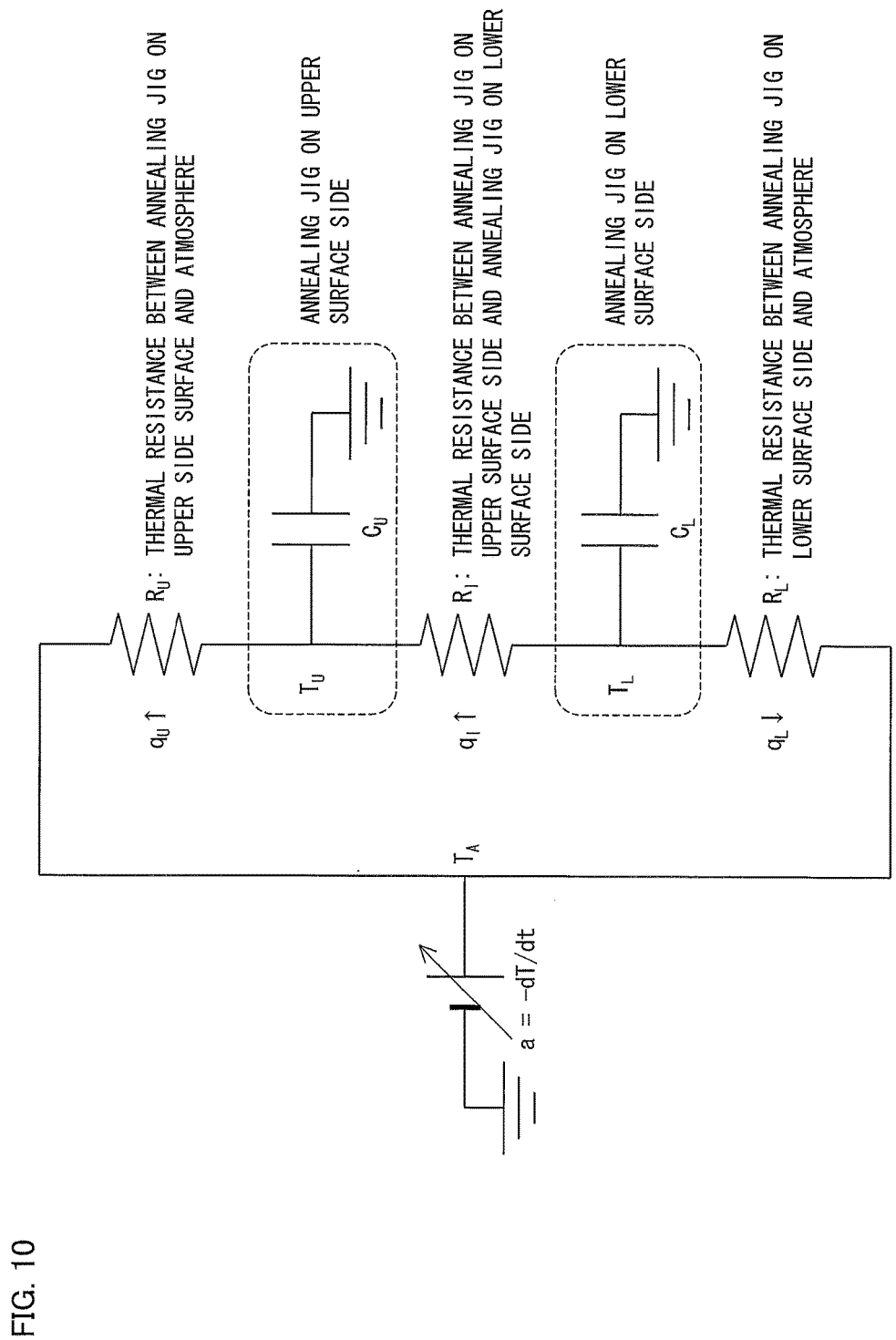

FIG. 10 is a diagram illustrating an equivalent thermal circuit during cooling in an air convection oven.

Figure 11:
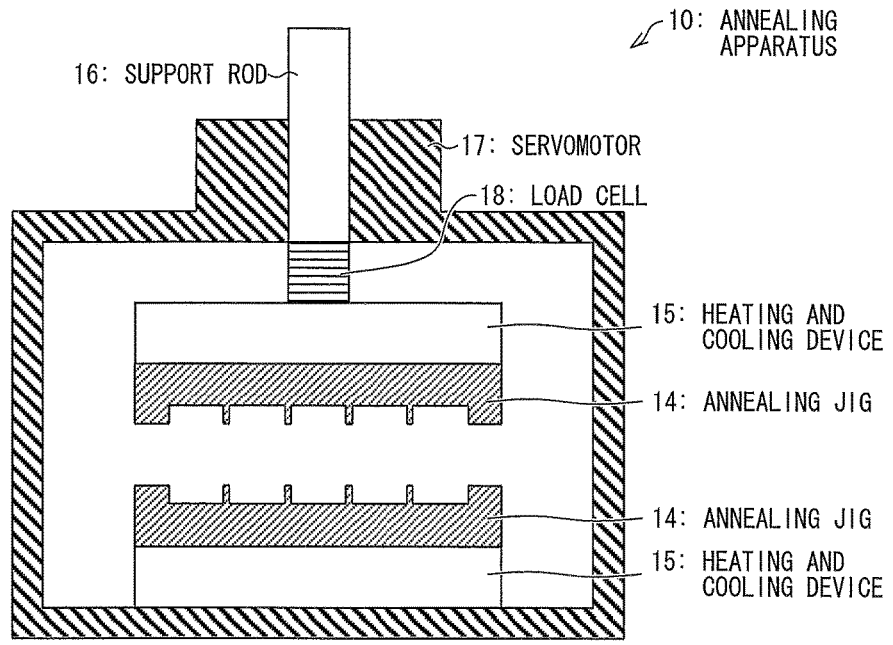

FIG. 11 is a cross-sectional view of an annealing apparatus according to Embodiment 2 of the present invention, and illustrates a state prior to insertion of a molded body.

Figure 12:
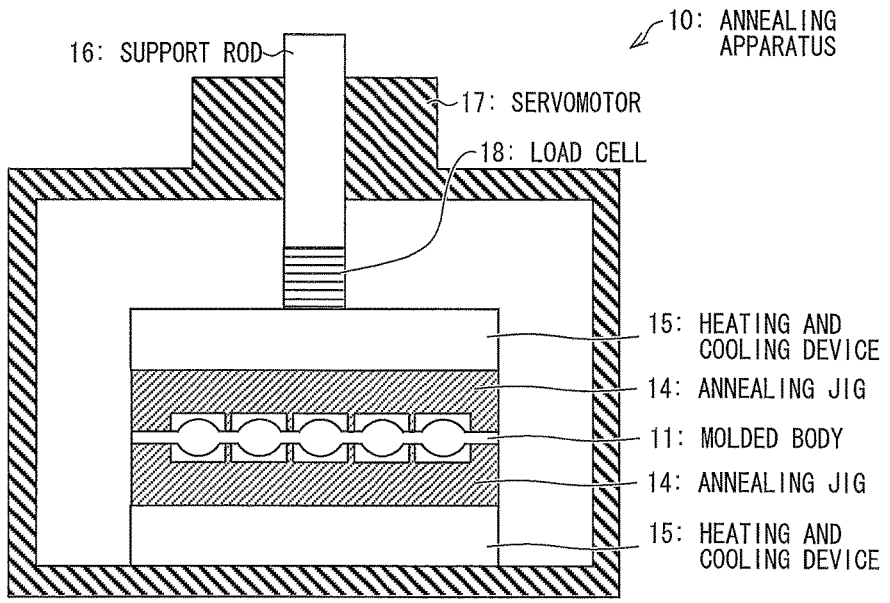

FIG. 12 is a cross-sectional view of an annealing apparatus according to Embodiment 2 of the present invention, and illustrates a state in which a molded body has been inserted.

Figure 13:
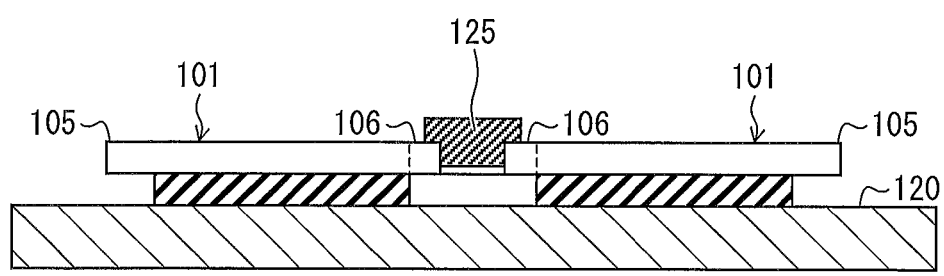

FIG. 13 is a diagram illustrating a conventional annealing method.

Figure 14:
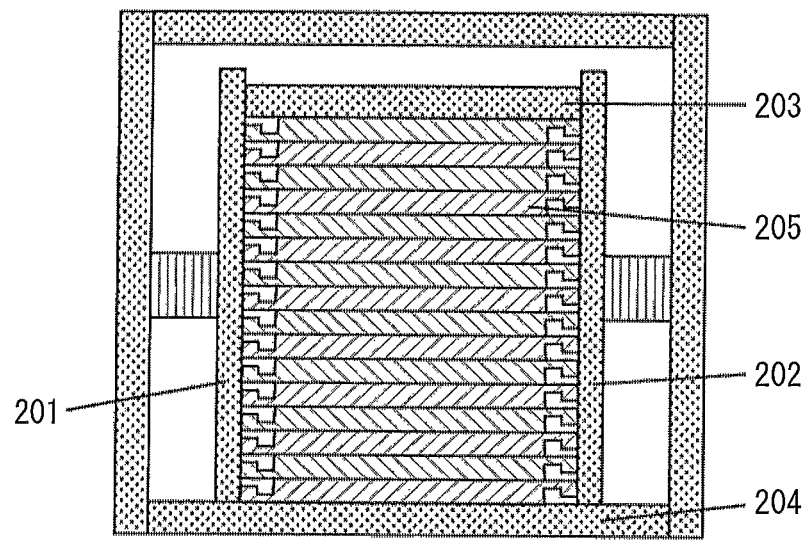

FIG. 14 is a diagram illustrating another conventional annealing method.

DESCRIPTION OF EMBODIMENTS

Outline of Present Invention

In the present invention, an annealing process for a molded body which has been molded from a molding material is divided into two steps including (I) a stress releasing step (the step (I), the first step) and (II) a warp correcting step (the step (II), the second step).

Figure 1:
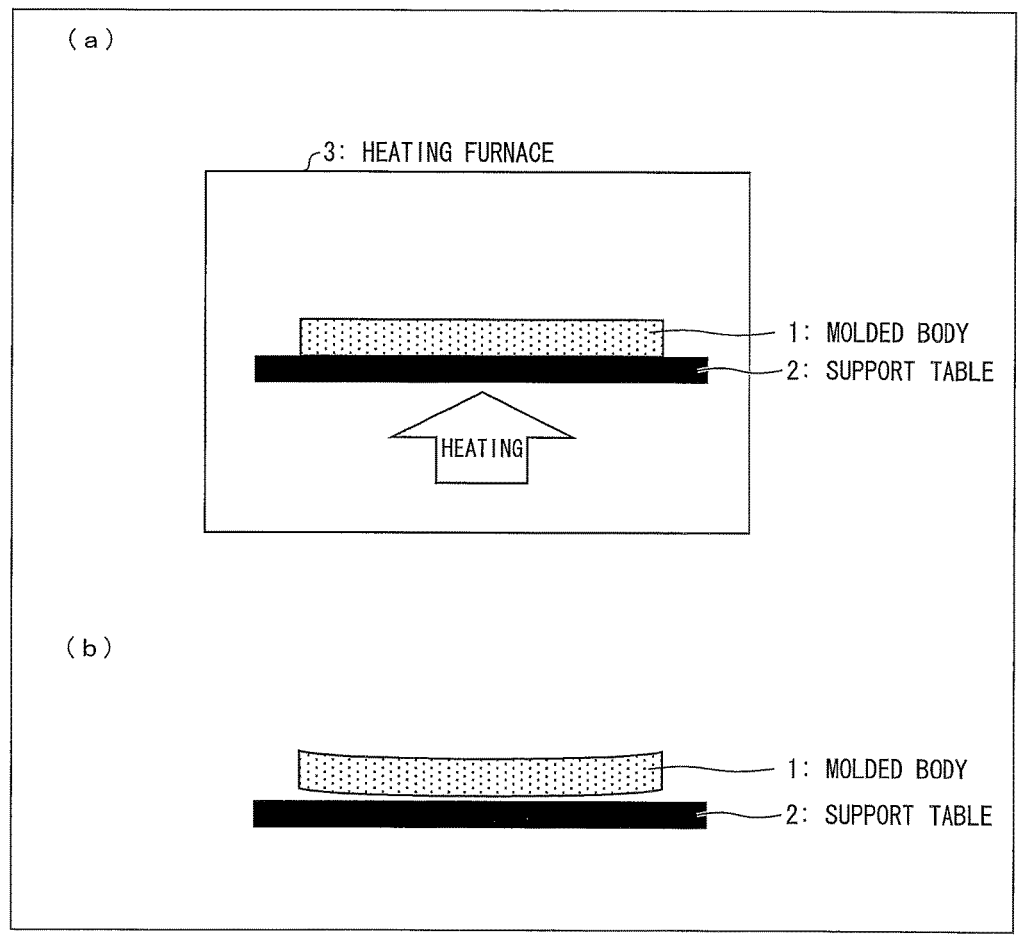
FIG. 1 is a schematic view for explaining a stress releasing step. (a) of FIG. 1 illustrates a state in which a molded body is heated. (b) of FIG. 1 illustrates a state in which a molded body after heating is warped.

FIG. 1 is a schematic view for explaining the stress releasing step. Stress of a molded body 1 is released by (i) mounting the molded body 1 on a support table 2 and (ii) heating the molded body 1 in a heating furnace (oven) 3 (see (a) of FIG. 1). Note that the molded body 1 may be mounted on a floor surface of the heating furnace 3. At this time, the molded body 1 is not fixed so that movement of molecules of a molded material due to stress releasing is not blocked. This causes a warp of the molded body 1 which has been taken out from the heating furnace 3 (see (b) of FIG. 1).

Figure 2:
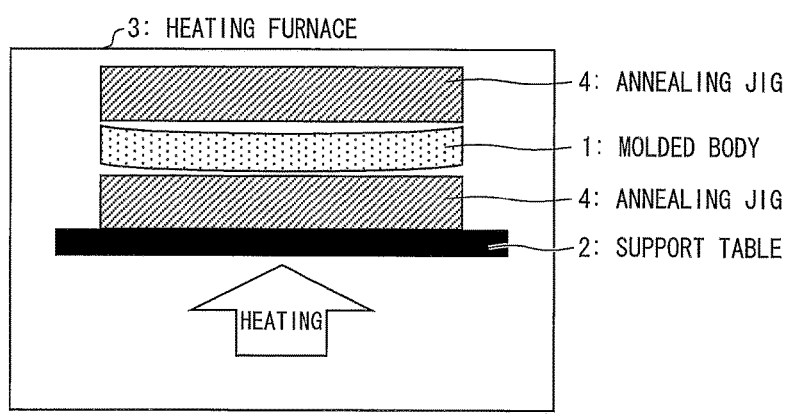
FIG. 2 is a schematic view for explaining a warp correcting step. (a) of FIG. 2 illustrates a state in which a molded body is heated while a load is applied to the molded body. (b) of FIG. 2 illustrates a state in which a warp of the molded body is corrected.
Figure 2:
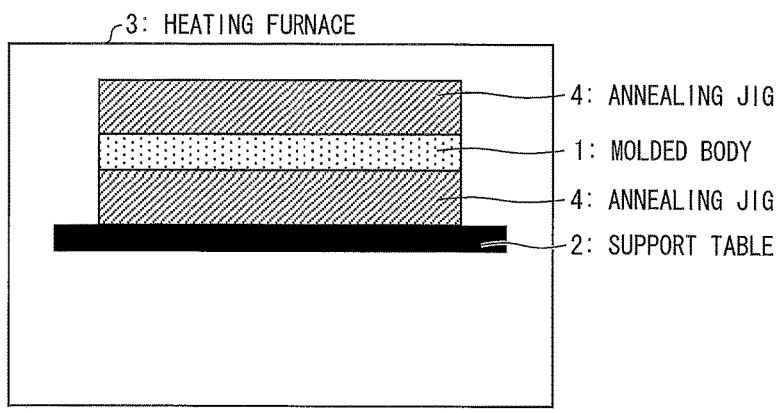

FIG. 2 is a schematic view for explaining the warp correcting step. Both surfaces of the molded body 1 are sandwiched between the two annealing jigs 4 (see (a) of FIG. 2), and the molded article 1 is heated so that a remaining warp of the molded body 1 is corrected. As a result, the molded body 1 softens at a high temperature, and consequently, the warp of the molded body 1 is corrected due to a load of the annealing jig 4 (see (b) of FIG. 2).

In the configuration disclosed in Patent Literature 2, movement of material molecules of a molded body is restricted. This caused a problem that stress is not sufficiently released. On the other hand, in the present invention, movement of material molecules of the molded body 1 has been mostly completed in the stress releasing step. Therefore, an amount of the movement of the material molecules is small in the warp correcting step in which the molded body 1 is fixed by the annealing jigs 4. Therefore, the stress is sufficiently released in the warp correcting step, and consequently, the molded body 1 free from distortion or warp can be obtained.

Figure 3:
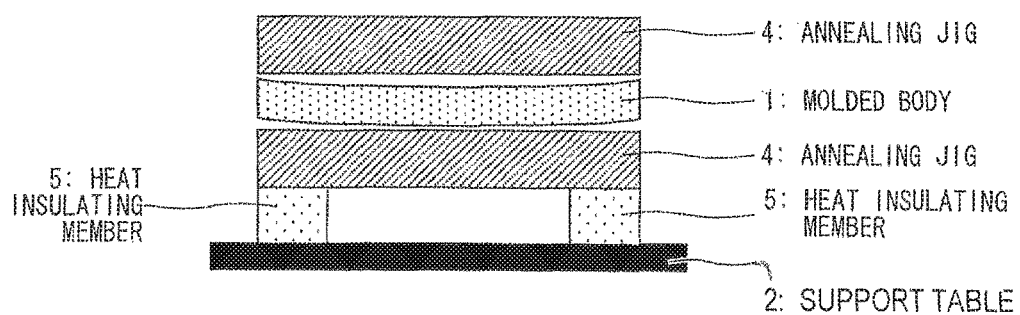
FIG. 3 is a diagram illustrating a configuration in which an air flow passage is formed between (i) an annealing jig which is provided on a lower surface side of the molded body and (ii) a support table.

Note that it is preferable that a heat insulating member 5, for example, be inserted between the annealing jig 4 and the support table 2 which are provided on a lower side, so as to form an air flow passage between (i) the annealing jig 4 on the lower side and (ii) the support table 2 (see FIG. 3). In a case where the annealing jig 4 on the lower side is mounted on the floor surface of the heating furnace 3, it is preferable that an air flow passage be formed between the annealing jig 4 on the lower side and the floor surface of the heating furnace 3. This makes it possible to cool the molded body 1 through not only radiation and conduction but also air convection. This makes a thermal capacity of the annealing jig 4 on an upper side equal to a thermal capacity of the annealing jig 4 on the lower side. At the same time, it also becomes possible to reduce a difference between a thermal resistance of the annealing jig 4 on the upper side and a thermal resistance of the annealing jig 4 on the lower side.

Embodiment 1

The following discusses Embodiment 1 with reference to FIGS. 4 through 6.

[Configuration of Molded Body and Apparatus]

(a) of FIG. 4 is a plan view of a molded body 11 according to Embodiment 1. (b) of FIG. 4 is a cross-sectional view of the molded body 11 taken along the line A-A'. The molded body 11 is wafer-level disk-shaped lenses and made of a silicone thermosetting resin as a molding material. This silicone thermosetting resin has a glass transition point Tg of approximately 140° C. after curing and a molding temperature of 150° C. The molded body 11 has the following size: 100 mm in diameter $\phi$; and 0.74 mm in thickness. Both surfaces of the molded body 11 are provided with a plurality of lens portions (protruding element portions) 11a that are orderly arranged (see (b) of FIG. 4).

(a) of FIG. 5 is a plan view of an annealing jig 14 according to Embodiment 1. (b) of FIG. 5 is a cross-sectional view of the annealing jig 14 taken along the line B-B'. The annealing jig 14 is a 100-mm-square aluminum plate having a thickness of 10 mm. The annealing jig 14 has a mass of 270 grams.

Two of the annealing jig 14 make a pair (see FIG. 6). The molded body 11 is sandwiched between the pair of annealing jigs 14 in the warp correcting step. One surface of each of the annealing jigs 14 is provided with hollows 14a having a depth of 3 mm. These hollows 14a are formed at positions that correspond to the lens portions 11a of the molded body 11, respectively. This makes it possible to prevent touch between the annealing jigs 14 and the lens portions 11a. In Embodiment 1, a total of 25 hollows 14a (5 in a vertical direction×5 in a horizontal direction) are arranged at pitches of 3.44 mm.

Note that instead of the hollows 14a, through holes which pierce upper and lower surfaces of the annealing jig may be formed. This makes temperatures of the annealing jigs 14 and the molded body 11 increase more easily. Accordingly, it is possible to shorten a time for a heating sub-step.

Moreover, in Embodiment 1, an air convection oven is used as an annealing apparatus.

[Stress Releasing Step]

The following discusses the stress releasing step according to Embodiment 1, in the above configuration. An object of the stress releasing step is to complete curing reaction of the molded body 11 (to stabilize a refractive index of the molded material) and to release residual stress caused by molding. The molded body 11 is heated at an intended temperature of 180° C. for a heating time of 30 minutes. Specifically, the following sub-steps (1) through (3) are performed.

(1) Removal of Burr and Dust of Molded Body

A burr(s) in a peripheral area of the molded body 11 is cut while ductility of the molded body 11 molded from a molding material remains to some extent. First, the burr(s) is cut with scissors. At this time, it is necessary to ensure that no crack occurs in a wafer that is the molded body 11. Then, after a charge is removed from the molded body 11 by means of an anti-static blow, dust is blown off with use of a blower. Further, remaining dust is removed with use of tweezers. Subsequently, it is checked that there is no visible dust on front and back surfaces of the molded body 11.

(2) Loading into Annealing Apparatus

After it is checked that an indication of the temperature in the annealing apparatus is 180° C., the molded body 11 is loaded into the annealing apparatus in a manner such that the molded body 11 is laid down on aluminum foil. When the molded body 11 is loaded into the annealing apparatus, the temperature inside the annealing apparatus becomes lower. Therefore, a heating time is counted from a time point at which the temperature inside the annealing apparatus is recovered to "the intended temperature−10 K" (170° C.). Note that when one molded body 11 is stacked on another molded body 11, these molded bodies 11 may fuse with each other.

(3) Taking Out Molded Body

The molded body 11 is taken out together with the aluminum foil from the annealing apparatus, when 30 minutes have elapsed from recovery of the temperature inside the annealing apparatus to not less than 170° C. The heating time is sufficiently longer than 200 seconds which is a measured value of a temperature-rise time constant of the molded body 11, and a temperature of the molded body 11 reaches a temperature that is substantially equal to the intended temperature. The molded body 11 having been taken out is naturally air-cooled.

As described above, the molded body 11 is heated at a temperature higher than the glass transition point (140° C.), so that the stress is released in a short period of time. Note that when the heating temperature is lower than the glass transition point, the time necessary for releasing the stress becomes very long (an order of several hours or several days).

Meanwhile, when the heating temperature is too high, the molded body may be deformed. When the heating time is too long, the molded body may be deformed and/or deterioration such as yellowing may occur. On the contrary, when the heating time is too short, a refractive index may not stabilize.

[Warp Correcting Step]

The following discusses the warp correcting step according to Embodiment 1. An object of the warp correcting step is to correct a warp of the molded body 11 which warp has occurred in the stress releasing step. The molded body 11 is reheated at an intended temperature of 180° C. for a heating time of 60 minutes. Specifically, the following sub-steps (4) through (10) are performed.

(4) Removal of Dust on Molded Body

Dust sticking to the molded body 11 is removed so that the molded body 11 is completely and evenly pressed with use of the annealing jigs 14. First, a charge is removed from the molded body 11 by means of an anti-static blow, and then dust is blown off with use of a blower. Further, remaining dust is removed with use of tweezers. Subsequently, it is checked that there is no visible dust on the front and back surfaces of the molded body 11.

(5) Cleaning of Annealing Jigs

When dirt is adhering to a surface of the annealing jigs 14 which surface abuts on the molded body 11, the dirt is removed with a Bemcot® cloth into which isopropyl alcohol is impregnated. Then, dust is blown off with use of a blower.

(6) Insertion Between Annealing Jigs (Load Applying Sub-Step)

When the lens portions 11a of the molded body 11 project from a flat-surface portion of the molded body 11, the molded body 11 is carefully inserted between the annealing jigs 14 so that the lens portions 11a do not touch the annealing jigs 14 (see FIG. 6). In this state where the molded body 11 is inserted between the annealing jigs 14, a Kapton® tape is provided to two positions for fixation. Note that the Kapton® tape is adhered in a manner such that the Kapton® tape is slightly sagging. This is because the molded body 11 becomes thicker due to thermal expansion or the like in some cases. Note that a load is applied to the molded body 11 not with tensile force of the Kapton® tape but with a weight of the annealing jig 14.

Note that a load P (concentrated load at the center) necessary to correct a warp 6 of the molded body 11 that is disk-shaped is determined by the following expression.

$$P \approx 2\frac{\delta E h^3}{R^2} \qquad \text{[Math. 3]}$$

E: Young's modulus at an annealing temperature
h: a thickness of the molded body
R: a radius of the molded body On the assumption that regarding the molded body 11, δ=10 mm, E=200 MPa, h=1 mm, and R=50 mm, then, P=1.6 N. Since the mass of the annealing jig 14 according to Embodiment 1 is 270 grams, a sufficient load can be applied.

(7) Loading into Annealing Apparatus, and Heating (Heating Sub-Step)

After it is checked that an indication of the temperature in the annealing apparatus is 180° C., a jig set including the annealing jigs 14 and the molded body 11 is loaded into the annealing apparatus carefully so that a positional relationship between the annealing jigs 14 and the molded body 11 does not change. At this time, the jig set may be placed in a manner such that the jig set is floating relative to a shelf board inside the annealing apparatus by use of a heat insulating member such as cork. When the jig set is loaded into the annealing apparatus, the temperature inside the annealing apparatus becomes lower. Therefore, the heating time is counted from a time point at which the temperature inside the annealing apparatus recovers to "the intended temperature−10 K" (170° C.).

(8) Gradual Cooling (Cooling Sub-Step)

The above heating is stopped when 60 minutes have elapsed from recovery of the temperature inside the annealing apparatus to not less than 170° C. The heating time is four times as long as 900 seconds which is a measured value of the temperature-rise time constant of the annealing jigs 14. The temperature of the molded body is estimated to have reached 177° C. Then, gradual cooling is carried out so as to reduce a warp caused by a difference in temperature between the upper and lower surfaces of the molded body 11 which is being cooled. The warp is an order of approximately 10 μm, when a cooling rate is set to not more than 1 K/minute in a temperature range of the temperature inside the annealing apparatus from "a glass transition point Tg+10" to "the glass transition point Tg−50K" (150° C. to 90° C.).

(9) Taking Out Molded Body

The jig set is taken out from the annealing apparatus, when not less than five minutes has elapsed from a time point at which the temperature inside the annealing apparatus becomes "Tg−50 K" (90° C.). Then, the jig set is naturally air-cooled.

(10) Collection of Molded Body

After the jig set is naturally air-cooled for not less than five minutes, the jig set is opened and the molded body is collected.

[Verification Experiment]

In a verification experiment, after a molded body had undergone the stress releasing step and the warp correcting step, the molded body was collected. Then, the molded body was measured by using Nexiv® image measuring system that was manufactured by Nikon Corporation, so that positional (XY) coordinates of each lens portion in a plane of the molded body was obtained.

Specifically, (i) lens positional errors of respective single-lens positions (coordinates of the lens portions), each of which lens positional errors is a distance from an ideal grid point that corresponds to one of the single-lens positions, and (ii) a lens positional variation of the single-lens positions were determined (see FIG. 7). The ideal grid point means a grid point of an orthogonal grid (an ideal grid) whose pitch, shift amount, and rotation amount are determined so that a square sum of the lens positional errors as described above is minimum. The lens positional variation is a mean square of the lens positional errors.

Furthermore, lens positional errors and a lens positional variation were measured for a molded body obtained according to a conventional annealing method. Note that 10 molded bodies were annealed by the annealing method according to Embodiment 1 and 10 other molded bodies were annealed by the conventional annealing method.

[Measurement Results]

FIG. 8 shows measurement results. (a) of FIG. 8 is a plan view of lens positional errors of Sample A which is the molded bodies obtained according to the annealing method of Embodiment 1. (b) of FIG. 8 is a plan view of lens positional errors of Sample B which is the molded bodies obtained according to the conventional annealing method. Note that each of the lens positional errors is presented in a manner such that each distance between grid points is magnified 200 times.

Table 1 shows average shrinkage rates and positional variations of Sample A and average shrinkage rates and positional variations of Sample B. Note that an average shrinkage rate means a shrinkage rate of pitches of an ideal grid with respect to pitches (3.44 mm) of hollows of the annealing jigs.

TABLE 1

| | Sample A | | Sample B | |
|---|---|---|---|---|
| No. | Average Shrinkage Rate/ % | Positional Variation/ um | Average Shrinkage Rate/ % | Positional Variation/ um |
| 1 | 2.08 | 0.41 | 2.09 | 1.88 |
| 2 | 2.09 | 0.41 | 2.09 | 3.39 |
| 3 | 2.08 | 0.98 | 2.10 | 1.68 |
| 4 | 2.09 | 0.48 | 2.09 | 2.18 |
| 5 | 2.09 | 0.49 | 2.07 | 3.84 |
| 6 | 2.10 | 0.95 | 2.08 | 4.03 |
| 7 | 2.10 | 0.57 | 2.14 | 2.38 |
| 8 | 2.08 | 1.10 | 2.09 | 4.08 |
| 9 | 2.08 | 0.49 | 2.09 | 4.05 |
| 10 | 2.10 | 1.16 | 2.09 | 5.18 |
| Average | 2.09 | 0.70 | 2.09 | 3.27 |

It is clear from Table 1 that the positional variation of Sample A is much smaller than the positional variation of Sample B. This can verify that an effect of reducing distortion of a molded body is obtained by the annealing method of Embodiment 1.

Next, the following discusses a warp that occurs in the molded body in the cooling sub-step of warp correction.

As described below, in the cooling sub-step, the warp of the molded body 11 can be reduced when the difference in temperature is reduced between the upper and lower surfaces of the molded body. Therefore, a temperature-decrease rate is not directly limited. In practice, however, it is desirable to set a limitation to the temperature-decrease rate. This is because a thermal resistance between the air and the annealing jig on an upper surface side is different from that on a lower surface side.

[Difference in Temperature Between Upper and Lower Surfaces of Molded Body, and Warp of Molded Body]

In a case where there is a difference $\Delta T_w$ in temperature between the upper and lower surfaces of the molded body, the following relationship exists due to difference in thermal expansion (see FIG. 9).

$$\frac{d}{r} = \alpha \cdot \Delta T_W \qquad [\text{Math. 4}]$$

d: a thickness of the molded body

α: a thermal expansion coefficient of the molding material $\Delta T_w$: a difference in temperature between the upper and lower surfaces of the molded body r: a radius of curvature of the warp generated in the molded body Note that on the assumption that X is a size of the molded body (a diameter when the molded body has a circular shape), a warp amount ΔZ of the molded body is determined by the following expression.

$$\Delta Z = \frac{X^2}{8r} \quad \text{[Math. 5]}$$

As described above, a warp occurs due to a difference in thermal expansion between the upper and lower surfaces of the molded body. Note that although this warp is corrected to be level by the annealing jigs during annealing, this results in storage of internal stress and subsequently causes a warp.

[Temperature-Decrease Rate During Cooling in Air Convection Oven, and Difference in Temperature Between Upper and Lower Surfaces of Jig and Molded Body]

A difference $\Delta T_I$ in temperature between the annealing jig on the upper surface side and the annealing jig on the lower surface side (=the temperature $T_L$ of the annealing jig on the upper surface side–the temperature $T_U$ of the annealing jig on the lower surface side) is estimated. This difference in temperature is a difference in a case where (a) an atmosphere temperature is decreased at a temperature-decrease rate a and (b) the annealing jig on the upper surface side and the annealing jig on the lower surface side are also cooled at the same temperature-decrease rate a. In disregard of a thermal resistance inside the annealing jig and a thermal capacity of the molded body, an equivalent thermal circuit during cooling in the oven is approximated as illustrated in FIG. 10. On the assumption that: a thermal resistance and a heat flow between the annealing jig on the upper surface side and the atmosphere is $R_U$ and $q_U$, respectively; a thermal resistance and a heat flow between the annealing jig on the upper surface side and the annealing jig on the lower surface side are $R_I$ and $q_I$, respectively; and a thermal resistance and a heat flow between the annealing jig on the lower surface side and the atmosphere is $R_L$ and $q_L$, respectively, the following expressions each are obtained from a relationship between a difference in temperature and the heat flow:

$$T_u - T_A = q_U R_U$$

$$T_L - T_A = q_L R_L$$

$$T_L - T_u = q_I R_I.$$

Further, on the assumption that $C_U$ is the thermal capacity of the annealing jig on the upper surface side and $C_L$ is the thermal capacity of the annealing jig on the lower surface side, the following expressions each are obtained from a relationship between the temperature-decrease rate and the heat flow:

$$q_U - q_I = a C_U$$

$$q_L + q_I = a C_L.$$

By eliminating $q_U$, $q_I$, $q_L$ and $T_A$ from these expressions, $\Delta T_I$ is obtained as follows:

$$\Delta T_I = a(C_L R_L - C_U R_U)\frac{R_I}{R_L + R_U + R_I}. \quad \text{[Math. 6]}$$

Note that on the assumption that $R_W$ is a thermal resistance of the molded body and $R_C$ is a contact thermal resistance between the annealing jig and the molded body, the following expression is obtained:

$$R_I = 2R_C + R_W.$$

Therefore, the difference $\Delta T_W$ in temperature between the upper and lower surfaces of the molded body is expressed as follows:

$$\Delta T_W = \frac{R_W}{R_I} \Delta T_I \quad \text{[Math. 7]}$$

$$= \frac{R_W}{2R_C + R_W} \Delta T_I.$$

[Estimation of Respective Values of Difference in Temperature and Temperature-Decrease Rate]

Under rather strict conditions, a desirable range of the difference $\Delta T_W$ in temperature and a desirable range of the temperature-decrease rate a are estimated as follows:

$$\Delta T_W < 0.2 \text{ K},$$

in a case where: the thickness d of the molded body=0.5 mm; the thermal expansion coefficient of the molding material $\alpha = 1 \times 10^{-4}$/K; the size of the molded body X=100 mm; and the warp amount of the molded body $\Delta Z < 50$ μm.

Further, on the assumption that: the molded body has a circular plate shape having a diameter X; a thermal conductivity is 0.2 W/K·m; and a contact thermal conductivity between the molded body and the annealing jig is 1000 W/K·m², the thermal resistance of the molded body $R_W$=0.32 K/W, the thermal resistance between the annealing jig on the upper surface side and the annealing jig on the lower surface side $R_I$=0.57 K/W, and the difference in temperature between the annealing jig on the upper surface side and the annealing jig on the lower surface side $\Delta T_I < 0.36$ K.

On the assumption that the annealing jig is made of aluminum, a size of the annealing jig is 100 mm in length, 100 mm in width, and 10 mm in thickness, the thermal capacity $C_U$ of the annealing jig on the upper surface side=the thermal capacity $C_L$ of the annealing jig on the lower surface side=240 J/K. Furthermore, on the assumption that an average thermal conductivity on a surface of the annealing jig on the upper surface side is 20 W/K·m² and an average thermal conductivity on a surface of the annealing jig on the lower surface side is 15 W/K·m² (≈measured values in the air convection oven≈calculated values at a wind speed of 2 m/s), the thermal resistance between the annealing jig on the upper surface side and the atmosphere $R_U$=3.6 K/W and the thermal resistance between the annealing jig on the lower surface side and the atmosphere $R_L$=4.8 K/W. Therefore, a should be set as follows: a<1.2 K/min.

It is desirable to set the difference in temperature between the annealing jig on the upper surface side and the annealing jig on the lower surface side to not more than 0.3 K, and an average temperature-decrease rate of the atmosphere temperature to not more than 1 K/minute, in consideration of giving a margin.

When the average temperature-decrease rate of the atmosphere temperature is approximately 1 K/minute, the difference in temperature between the atmosphere and the molded body is in a range of 10 K through 30 K. Therefore, desirably, while the atmosphere temperature in the air convection oven is within a range of "the glass transition point Tg+10" through "the glass transition point Tg−50 K" after the stress releasing step of the molding material, the difference in temperature between the annealing jig on the upper surface side and the annealing jig on the lower surface side is set to not more than 0.3 K and the average temperature-decrease rate of the atmosphere temperature is set to not more than 1 K/minute.

[Reduction of Difference in Temperature Between Jigs]

Note that a method of reducing a difference in temperature between the annealing jig on the upper surface side and the annealing jig on the lower surface side includes (i) a method according to which the annealing jig on the lower surface side is formed so as to be thinner than the annealing jig on the upper surface side and (ii) a method according to which the annealing jig is painted in black.

The thermal resistance $R_L$ between the annealing jig on the lower surface side and the atmosphere is greater than the thermal resistance $R_U$ between the upper surface side of the annealing jig and the atmosphere. However, in a case where the annealing jig on the lower surface side is formed so as to be thinner than the annealing jig on the upper surface side, the thermal capacity $C_L$ of the annealing jig on the lower surface side can be smaller. This consequently makes $C_L R_L - C_U R_U$ approach zero. As a result, the difference $\Delta T_I$ in temperature between the annealing jib on the upper surface side and the annealing jib on the lower surface side can be reduced.

When the annealing jig has not been subjected to a treatment (described later) for increasing a thermal radiation rate and heat is dissipated from the annealing jig only through air convection, the thermal conductivity of the annealing jig on the lower surface side is approximately ¾ of the annealing jig on the upper side surface ($R_L \approx 4R_U/3$). Therefore, the thickness of the annealing jig on the lower surface side should be set to approximately ¾ of the thickness of the annealing jig on the upper side. Note, however, that an optimum thickness of the annealing jig changes depending on a ratio of the thermal radiation rate of the annealing jig on the upper side and the thermal radiation rate of the annealing jig on the lower side, for example. It is possible to easily reduce the difference $\Delta T_I$ in temperature between the annealing jig on the upper surface side and the annealing jig on the lower surface side, by setting the thickness of the annealing jig on the lower surface side to a thickness that is ½ to 1 time as large as the thickness of the annealing jig on the upper surface side, or more favorably, ⅝ to ⅞ time as large as the thickness of the annealing jig on the upper surface side.

Moreover, $R_U$ and $R_L$ can be decreased by subjecting the annealing jig to the treatment for increasing the thermal radiation rate of the annealing jig. This makes it possible to reduce the difference $\Delta T_I$ in temperature between the annealing jig on the upper surface side and the annealing jig on the lower surface side. The treatment increasing a thermal radiation rate of the annealing jig includes (i) black painting, (ii) sticking of black tape, (iii) black anodized aluminum (alumite) process, and (iv) covering the annealing jig with an insulator having a high thermal radiation rate.

Note that a reduction in thermal resistance as a result of increasing the radiation rate can be expressed as follows:

$$\frac{1}{R'_L} = \frac{1}{R_L} + G_R \quad \text{[Math. 8]}$$

$$\frac{1}{R'_U} = \frac{1}{R_U} + G_R.$$

An improvement of $\Delta T_I$ can be expressed as follows:

$$\Delta T'_I = a\left(C\frac{R_L}{1+R_L G_R} - C\frac{R_U}{1+R_U G_R}\right) \quad \text{[Math. 9]}$$

$$\frac{R_I}{\frac{R_L}{1+R_L G_R} + \frac{R_U}{1+R_U G_R} + R_I} =$$

$$aC(R_L - R_U)\frac{R_I}{R_L(1+R_U G_R) + R_U(1+R_L G_R) + R_I(1+R_L G_R)(1+R_U G_R)}$$

$$\frac{\Delta T'_I}{\Delta T_I} \cong \frac{1}{1 + \frac{2R_L R_U}{R_L + R_U}G_R}$$

where $C_L = C_U = C$.

On an assumption that: average convection thermal conductivities are 20 W/K·m² for the surface of the annealing jig on the upper surface side and 15 W/K·m² for the surface of the annealing jig on the lower surface side; and a radiant thermal conductivity increased from 0 W/K·m² to 9 W/K·m², $\Delta T_I$ is reduced to substantially ⅔. This can consequently reduce the warp to ⅔, or extend an upper limit of the temperature-decrease rate by 1.5 times.

Embodiment 2

The following discusses Embodiment 2 with reference to FIGS. 11 and 12. In Embodiment 2, a molded body 11 to be annealed is identical to the molded body 11 in Embodiment 1, except that the molded body 11 in Embodiment 2 is made of an epoxy thermosetting resin and has a thickness of 0.5 mm. A stress releasing step in Embodiment 2 is also identical to the stress releasing step in Embodiment 1.

[Configuration of Annealing Apparatus]

FIG. 11 is a cross-sectional view of an annealing apparatus 10 according to Embodiment 2. The annealing apparatus 10 has an inner space enclosed by a heat insulating wall. The inner space is provided with a pair of annealing jigs 14 and a pair of heating and cooling devices (temperature controlling plate, temperature controlling member) 15. The heating and cooling devices 15 each do not have to have a plate form.

The heating and cooling devices 15 each are configured so as to have a heating wire and a cooling pipe in an aluminum base material. Hollows 14a are formed to one surface of each of the annealing jigs 14 while no hollow 14a is formed to the other surface of each of the annealing jigs 14. The other surface having no hollow 14a is attached to a corresponding one of the heating and cooling devices 15. One of the heating and cooling devices 15 is mounted on an inner bottom surface of the annealing apparatus 10, while the other heating and cooling device 15 is supported by a support rod 16. In this configuration, the two annealing jigs 14 are arranged such that the surfaces having the hollows 14a face each other.

The support rod 16 is movable downward (in a press direction) by a servomotor 17. This allows the annealing jig on the upper surface side to move relative to the annealing jig 14 on the lower surface side.

Moreover, a load cell 18 is provided at a connection point of the annealing jig 14 on the upper surface side and the support rod 16. The load cell 18 detects a press load onto the molded body 11 and then feeds back a detection result to the servomotor 17. Note that a position where the load cell 18 is to be provided may be any position where the press load can be detected, such as a position below the annealing jig 14 on the lower surface side. Moreover, a heat insulating board may be interposed between the heating and cooling device 15 and the load cell 18 so that an influence of heat from the heating and cooling device 15 is avoided.

[Warp Correcting Step]

As described above, the stress releasing step in Embodiment 2 is identical to the stress releasing step in Embodiment 1. In a warp correcting step according to Embodiment 2, the molded body 11 whose stress has been released is reheated at an intended temperature of 180° C. for a heating time of 5 minutes. In other words, the warp correcting step according to Embodiment 2 is different from the warp correcting step in Embodiment 1 in length of the heating time.

First, as in Embodiment 1, the sub-steps of (4) removal of dust from the molded body and (5) cleaning of the annealing jigs are performed. Then, the following sub-steps (6') through (9') are performed.

(6') Insertion Between Annealing Jigs

When lens portions 11a of the molded body 11 project from a flat-surface portion, the molded body 11 is carefully inserted between the annealing jigs 14 so that the lens portions 11a do not touch the annealing jigs 14 (see FIG. 12).

(7') Setting Load Value (Load Applying Sub-Step)

A load value of the molded body 11 is set to not less than a load P which is obtained by Expression (A) as described in Embodiment 1. A value detected by a load cell 18 is fed back to a servomotor 17 so that the load value is fixed at thus set value.

(8') Temperature Control Program

The temperature of the heating and cooling device 15 is controlled as follows:
Standby temperature: 80° C.
Heating (Heating step): 20K/minute→180° C., held for five minutes
Cooling (Cooling step): 5K/minute→80° C.

In other words, the temperature is raised to 180° C. over five minutes. Then, after five minutes has elapsed at 180° C., the temperature is decreased to 80° C. over 20 minutes.

(9') Taking Out Molded Body

After not less than five minutes has elapsed after completion of cooling, a jig set is taken out and naturally air-cooled.

As described above, Embodiment 2 is different from Embodiment 1 in length of the heating time and in length of a cooling time. Note that the relationship between (i) the difference in temperature between the upper and lower surfaces of the molded body as described with reference to FIG. 9 and (ii) the warp of the molded body also applies to Embodiment 2.

Supplementary Note

The present invention is not limited to the description of the embodiment above, and can therefore be modified by a skilled person in the art within the scope of the claims. Namely, an embodiment derived from a proper combination of technical means disclosed in different embodiments is encompassed in the technical scope of the present invention. Further, a new technical feature can be obtained by combining technical means disclosed in the embodiment above.

CONCLUSION

As described above, an annealing method according to an aspect of the present invention is an annealing method according to an aspect of the present invention is a method of annealing a molded body which is molded from a molding material in a molding step, including the steps of: (I) releasing stress from the molded body by heating the molded body; and (II) correcting a warp of the molded body, by simultaneously heating the molded body and applying a load to the molded body.

According to the configuration, in the step (I), heating of the molded body that is not fixed causes the stress of the molded body to be released but at the same time causes the molded body to warp. In the step (II), the molded body is heated while a load is applied to the molded body. This causes the molded body to soften at a high temperature, and a warp of the molded body is corrected due to the load. Because movement of material molecules of the molded body has been mostly completed in the step (I), it is possible in the step (II) to heat the molded body in a state where the movement of the material molecules is very small. Therefore, in the step (II), the stress is sufficiently released. Consequently, it is possible to obtain the molded body free from residual stress and distortion.

Preferably, in an annealing method according to an aspect of the present invention, in the step (II), while a temperature of the molded body is in a range from (a) a temperature lower by 20 K than a glass transition point of the molded material having undergone the step (I) to (b) a temperature higher by 20 K than the glass transition point, a difference in temperature between an upper surface of the molded body and a lower surface of the molded body is reduced to not more than 0.2 K.

According to the configuration, it is possible to reduce the warp caused by thermal stress of the molded body.

Preferably, in an annealing method according to an aspect of the present invention, the following expression holds:

$$P \geq 8\frac{\delta E h^3}{L^2}, \quad [\text{Math. 1}]$$

where: P is the load; δ is a maximum warp amount of the molded body; E is Young's modulus at a temperature at which the molding material of the molded body is annealed; h is a thickness of the molded body; L is a diameter, a length of a side, or a length in a short direction of the molded body; and g is a gravitational acceleration.

According to the configuration, a sufficient load can be applied to the molded body for correcting the warp.

Preferably, in an annealing method according to an aspect of the present invention, in the step (I), the molded body is heated to a temperature higher than a highest temperature in the molding step.

According to the configuration, curing reaction of a non-reacted portion in the molded body after the molding step can be completed.

Preferably, in an annealing method according to an aspect of the present invention, in the step (I), the molded body is heated to a temperature higher than a glass transition point of the molding material having been molded.

Preferably, in an annealing method according to an aspect of the present invention, in the step (II), the molded body is heated to a temperature higher than a glass transition point of the molding material having undergone the step (I).

According to the configuration, it is possible to release the residual stress in the molded body after the molding step in a short period of time.

Preferably, in an annealing method according to an aspect of the present invention, the step (II) includes the sub-steps of: (i) applying a load to the molded body by inserting the upper surface and the lower surface of the molded body between a pair of two annealing jigs; (ii) heating, in an air convection oven, the molded body to which the load is applied; and (iii) cooling the molded body that has been heated.

Preferably, in an annealing method according to an aspect of the present invention, in the sub-step (iii), while an atmosphere temperature in the air convection oven is in a range from (a) a temperature lower by 50 K than a glass transition point of the molding material having undergone the step (I) to (b) a temperature higher by 10 K than the glass transition point of the molding material having undergone the step (I), a difference in temperature between the pair of two annealing jigs is reduced to not more than 0.3 K, the pair of two annealing jigs including an annealing jig provided on an upper surface side of the molded body and another annealing jig provided on a lower surface side of the molded body.

Preferably, in an annealing method according to an aspect of the present invention, in the sub-step (iii), while an atmosphere temperature in the air convection oven is in a range from (a) a temperature lower by 50 K than a glass transition point of the molding material having undergone the step (I) to (b) a temperature higher by 10 K than the glass transition point of the molding material having undergone the step (I), an average temperature-decrease rate of the atmosphere temperature is decreased to not more than 1 K/minute.

According to the configuration, it is possible to make the warp of the molded body very small.

Preferably, in an annealing method according to an aspect of the present invention, an air flow passage is formed between the annealing jig on a lower surface side of the molded body and a surface supporting the annealing jig on the lower surface side of the molded body.

According to the configuration, it is possible to cool the molded body through not only radiation and conduction but also air convection. This makes a thermal capacity of the annealing jig on the upper surface side and a thermal capacity of the annealing jig on the lower surface side identical to each other. At the same time, a difference in thermal resistance between the annealing jig on the upper surface side and the annealing jig on the lower surface side can be reduced.

Preferably, an annealing method according to an aspect of the present invention includes the steps of: (III) applying a load to the molded body by inserting the upper surface and the lower surface of the molded body between a pair of two annealing jigs whose temperatures each are controllable by use of a temperature controlling member; (IV) heating the molded body to which the load is applied, with use of the temperature controlling member; and (V) cooling the molded body which has been heated, with use of the temperature controlling member.

According to the configuration, the molded body is heated and cooled through heat conduction. Therefore, a time necessary for the step can be shortened.

A pair of two annealing jigs according to an aspect of the present invention are a pair of two annealing jigs that sandwiches therebetween an upper surface and a lower surface of a molded body having been molded into a plate-like shape from a molding material, the pair of two annealing jigs being used for applying a load to the molded body when the molded body whose stress has been released by heating is reheated.

According to the configuration, a load can be applied to the molded body when the upper and lower surfaces of the molded body are sandwiched between the two annealing jigs. By heating the molded body in this state, the warp of the molded body can be corrected.

Preferably, in a pair of two annealing jigs according to an aspect of the present invention, one of the two annealing jigs that is provided on a lower surface side of the molded body is thinner than another one of the two annealing jigs that is provided on an upper surface side of the molded body Preferably, in a pair of two annealing jigs according to the present invention, a thickness of the annealing jig on the lower surface side is ½ to 1 time as large as a thickness of the annealing jig on the upper surface side.

Preferably, in annealing jigs according to an aspect of the present invention, a thickness of the annealing jig on the lower surface side is ⅝ to ⅞ times as large as a thickness of the annealing jig on the upper surface side.

Preferably, in annealing jigs according to an aspect of the present invention, at least one of the two annealing jigs is subjected to a treatment for increasing a thermal radiation rate.

According to the configuration, the surfaces of the annealing jigs serve as thermal radiation surfaces. Accordingly, the difference in temperature between the two annealing jigs can be easily reduced.

Preferably, in annealing jigs according to an aspect of the present invention, the following expression holds:

$$m \geq 8\frac{\delta E h^3}{gL^2}, \qquad \text{[Math. 2]}$$

where: m is a mass of the annealing jig that is provided on the upper surface side of the molded body; δ is a maximum warp amount of the molded body; E is Young's modulus at a temperature at which the molding material of the molded body is annealed; h is a thickness of the molded body; L is a diameter, a length of a side, or a length in a short direction of the molded body; and g is a gravitational acceleration.

According to the configuration, a sufficient load can be applied to the molded body so that the warp can be corrected.

Preferably, in a pair of two annealing jigs according to an aspect of the present invention, a hollow is formed on a surface of each of the pair of two annealing jigs which surface abuts the molded body.

According to the configuration, even in a case where the protruding element portions are formed in the molded body, it is possible to prevent touch between the annealing jigs and the protruding element portions by having an arrangement in which the hollows correspond to the protruding element portions, respectively.

Preferably, in a pair of two annealing jigs according to an aspect of the present invention, a through hole is formed on a surface of each of the pair of two annealing jigs which surface abuts the molded body.

According to the configuration, the touch between the annealing jigs and the protrusion element portions can be prevented and the temperature of each of the annealing jigs and the molded body can be increased more easily. Therefore, a time necessary for the heating step can be shortened.

Preferably, in a pair of two annealing jigs according to an aspect of the present invention, the hollow is plurally formed in an ordered arrangement.

Preferably, in a pair of two annealing jigs according to an aspect of the present invention, the through hole is plurally formed in an ordered arrangement.

According to the configuration, it is possible to anneal the molded body having a plurality of optical elements formed in an ordered arrangement.

An annealing apparatus according to an aspect of the present invention includes: the pair of two annealing jigs as described above; and a temperature controlling member which controls respective temperatures of the pair of two annealing jigs.

According to the configuration, the molded body is heated and cooled through heat conduction. Accordingly, a time necessary for the step can be shortened.

Preferably, in an annealing apparatus according to an aspect of the present invention, the temperature controlling member reduces, to not more than 0.3 K, a difference in temperature between (i) the annealing jig that is provided on the upper surface side of the molded body and (ii) the annealing jigs that is provided on the lower surface side of the molded body, while the pair of two annealing jigs are being cooled.

According to the configuration, it is possible to reduce the warp caused by thermal stress of the molded body.

Preferably, in an annealing apparatus according to an aspect of the present invention, the following expression holds:

$$P \geq 8 \frac{\delta E h^3}{L^2},$$ [Math. 1]

where: P is a maximum load which the temperature controlling member is capable of applying to the molded body; δ is a maximum warp amount of the molded body; E is Young's modulus at a temperature at which the molding material of the molded body is annealed; h is a thickness of the molded body; L is a diameter, a length of a side, or a length in a short direction of the molded body; and g is a gravitational acceleration.

According to the configuration, a sufficient load can be applied to the molded body so that the warp can be corrected.

INDUSTRIAL APPLICABILITY

The present invention is applicable to annealing of a molded body which is molded from a molding material.

REFERENCE SIGNS LIST

1: Molded body
2: Support table
3: Heating furnace
4: Annealing jig
5: Heat insulating member
10: Annealing apparatus
11: Molded body
11a: Lens portion
14: Annealing jig
15: Heating and cooling device (temperature controlling member)
16: Support rod
17: Servomotor
18: Load cell

The invention claimed is:

1. A molding and annealing method comprising:
in a molding step preparing a molded body by heating a molding material to a temperature;
(I) releasing stress from the molded body by heating the molded body; and
(II) correcting a warp of the molded body, by simultaneously heating the molded body and applying a load to the molded body,
wherein in the step (II), while a temperature of the molded body is in a range from (a) a temperature lower by 20 K than a glass transition point of the molded material having undergone the step (I) to (b) a temperature higher by 20 K than the glass transition point, a difference in temperature between an upper surface of the molded body and a lower surface of the molded body is reduced to not more than 0.2 K, and
wherein in the step (I), the molded body is heated to a temperature higher than a highest temperature in the molding step.

2. The molding and annealing method as set forth in claim 1, wherein the following expression holds:

$$P \geq 8 \frac{\delta E h^3}{L^2},$$ [Math. 1]

where: P is the load; δ is a maximum warp amount of the molded body; E is Young's modulus at a temperature at which the molding material of the molded body is annealed; h is a thickness of the molded body; L is a diameter, a length of a side, or a length in a short direction of the molded body.

3. The molding and annealing method as set forth in claim 1, wherein in the step (II), the molded body is heated to a temperature higher than a glass transition point of the molding material having undergone the step (I).

4. The molding and annealing method as set forth in claim 1, wherein the step (II) includes the sub-steps of:
(i) applying a load to the molded body by inserting the upper surface and the lower surface of the molded body between a pair of two annealing jigs;
(ii) heating, in an air convection oven, the molded body to which the load is applied; and
(iii) stopping heating, in the air convection oven, of the molded body that has been heated to cool the molded body that has been heated.

5. The molding and annealing method as set forth in claim 4, wherein in the sub-step (iii), while an atmosphere temperature in the air convection oven is in a range from (a) a temperature lower by 50 K than a glass transition point of the molding material having undergone the step (I) to (b) a temperature higher by 10 K than the glass transition point of the molding material having undergone the step (I), a difference in temperature between the pair of two annealing jigs is reduced to not more than 0.3 K, the pair of two annealing jigs including an annealing jig provided on an upper surface side of the molded body and another annealing jig provided on a lower surface side of the molded body.

6. The annealing method as set forth in claim 4, wherein in the sub-step (iii), while an atmosphere temperature in the air convection oven is in a range from (a) a temperature lower by 50 K than a glass transition point of the molding material having undergone the step (I) to (b) a temperature higher by 10 K than the glass transition point of the molding material having undergone the step (I), an average temperature-decrease rate of the atmosphere temperature is decreased to not more than 1 K/minute.

7. The molding and annealing method as set forth in claim 4, wherein an air flow passage is formed between the annealing jig on a lower surface side of the molded body and a surface supporting the annealing jig on the lower surface side of the molded body.

8. The molding and annealing method as set forth in claim 1, wherein the step (II) includes the sub-steps of:
applying a load to the molded body by inserting the upper surface and the lower surface of the molded body between a pair of two annealing jigs whose temperatures each are controllable by use of a temperature controlling member;
heating the molded body to which the load is applied, with use of the temperature controlling member; and
cooling the molded body which has been heated, with use of the temperature controlling member, and
wherein the temperature controlling member comprises, in a metal base material, a heating wire and a cooling pipe in which a cooling medium is to be put.

* * * * *